US009807579B2

United States Patent
Le Creff et al.

(10) Patent No.: US 9,807,579 B2
(45) Date of Patent: Oct. 31, 2017

(54) METHOD THAT ENABLES THE USER OF A WIRELESS TELEPHONE TERMINAL TO ESTABLISH AN EMERGENCY CONNECTION IN A LOCAL NETWORK, AND TERMINAL AND SERVER FOR CARRYING OUT THIS METHOD

(71) Applicants: Michel Le Creff, Vigny (FR); Raymond Gass, Bolsenheim (FR)

(72) Inventors: Michel Le Creff, Vigny (FR); Raymond Gass, Bolsenheim (FR)

(73) Assignee: Alcatel Lucent, Boulogne-Billancourt (FR)

( * ) Notice: Subject to any disclaimer, the term of this patent is extended or adjusted under 35 U.S.C. 154(b) by 30 days.

(21) Appl. No.: 14/677,091

(22) Filed: Apr. 2, 2015

(65) Prior Publication Data

US 2015/0215759 A1 Jul. 30, 2015

Related U.S. Application Data

(63) Continuation of application No. 11/578,721, filed as application No. PCT/FR2005/000890 on Apr. 13, 2005, now Pat. No. 9,002,314.

(30) Foreign Application Priority Data

Apr. 19, 2004 (FR) ..................................... 04 04090

(51) Int. Cl.
*H04W 4/22* (2009.01)
*H04L 29/06* (2006.01)
(Continued)

(52) U.S. Cl.
CPC ........... *H04W 4/22* (2013.01); *H04L 63/0807* (2013.01); *H04L 67/04* (2013.01); *H04W 12/06* (2013.01);
(Continued)

(58) Field of Classification Search
None
See application file for complete search history.

(56) References Cited

U.S. PATENT DOCUMENTS 5,937,344 A * 8/1999 Zicker .................... H04W 4/22
455/404.1
6,070,065 A 5/2000 Armbruster et al.
(Continued)

FOREIGN PATENT DOCUMENTS

| WO | 03/009627 A | 1/2003 |
| WO | 03/030445 A | 4/2003 |
| WO | 03/088547 A | 10/2003 |

*Primary Examiner* — Min Jung
(74) *Attorney, Agent, or Firm* — Fay Sharpe, LLP

(57) ABSTRACT

When establishing an emergency connection in a wireless network having an authentication server, wherein a user terminal is a non-subscriber to the network, a dialed number is recognized as an emergency number and the terminal sends a start-up message to a radio access point of the network. The terminal receives a first message that requests the identity of the terminal, from the access point in response to the start-up message, and sends a second message, which contains the identity of the terminal and an indication indicating that the terminal is attempting to make an emergency call. An authentication server determines that the second message contains an indication that the call is an emergency call, and sends an acceptance message to the terminal via the access point wherein a port of the access point is validated to permit the terminal to establish an emergency connection.

22 Claims, 3 Drawing Sheets

(51) Int. Cl.
*H04W 12/08* (2009.01)
*H04W 24/02* (2009.01)
*H04W 76/00* (2009.01)
*H04L 29/08* (2006.01)
*H04W 12/06* (2009.01)
*H04W 84/12* (2009.01)

(52) U.S. Cl.
CPC ........... *H04W 12/08* (2013.01); *H04W 24/02* (2013.01); *H04W 76/007* (2013.01); *H04W 84/12* (2013.01)

(56) References Cited

U.S. PATENT DOCUMENTS

| | | |
|---|---|---|
| 6,112,075 A | 8/2000 | Weiser |
| 6,246,884 B1 | 6/2001 | Karmi et al. |
| 6,477,362 B1 | 11/2002 | Raith et al. |
| 6,574,484 B1 | 6/2003 | Carley |
| 6,647,270 B1 * | 11/2003 | Himmelstein ......... G06Q 10/10 342/352 |
| 6,975,619 B1 * | 12/2005 | Byers ................ H04M 3/42357 370/351 |
| 7,567,166 B2 | 7/2009 | Bourgine |
| 2002/0133716 A1 | 9/2002 | Harif |
| 2002/0142753 A1 | 10/2002 | Pecen et al. |
| 2003/0119481 A1 | 6/2003 | Haverinen et al. |
| 2004/0073793 A1 | 4/2004 | Takeda |
| 2004/0176066 A1 | 9/2004 | Binzel et al. |
| 2004/0192346 A1 * | 9/2004 | Chang ................... G01S 5/0027 455/456.1 |
| 2005/0009521 A1 | 1/2005 | Preece |
| 2005/0202799 A1 * | 9/2005 | Rollender ........... H04W 76/007 455/404.1 |
| 2006/0088020 A1 | 4/2006 | Gass |

* cited by examiner

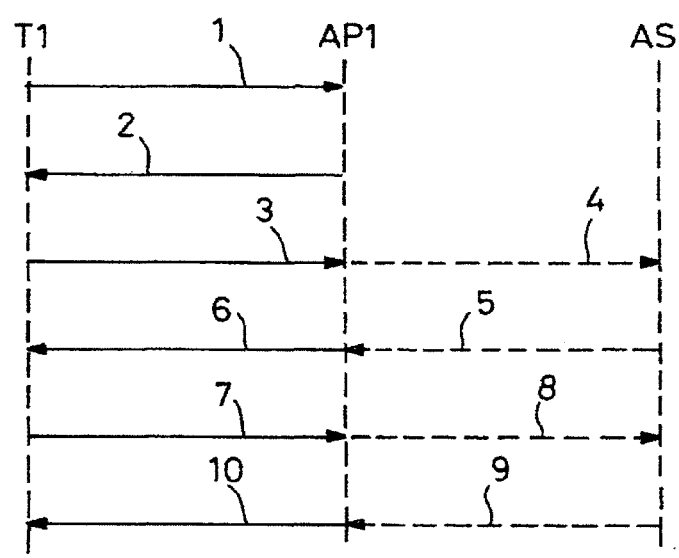
FIG_2
PRIOR ART

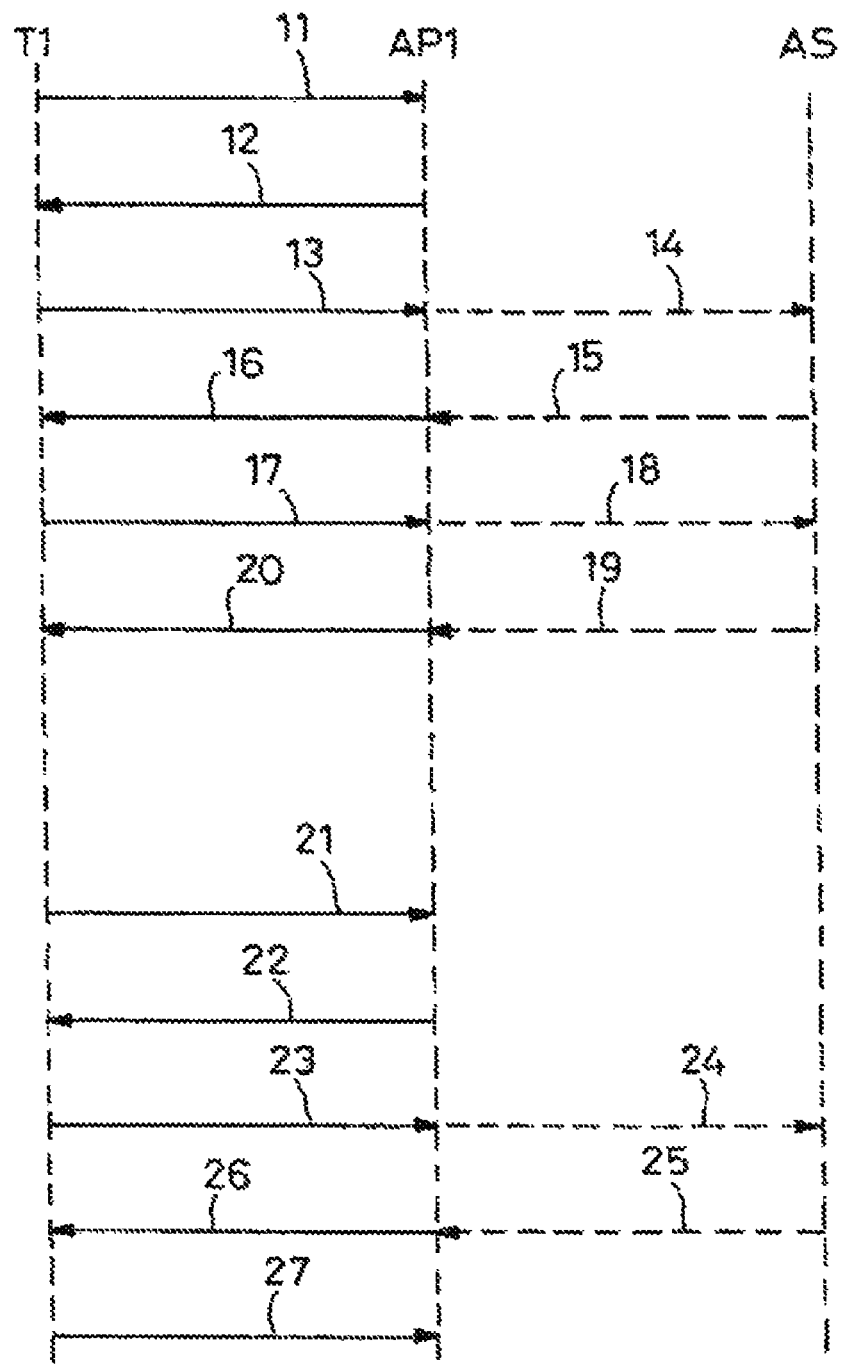

METHOD THAT ENABLES THE USER OF A WIRELESS TELEPHONE TERMINAL TO ESTABLISH AN EMERGENCY CONNECTION IN A LOCAL NETWORK, AND TERMINAL AND SERVER FOR CARRYING OUT THIS METHOD

BACKGROUND OF THE INVENTION

The invention concerns a method that enables the user of a wireless telephone terminal, intended to be connected to a wireless local network of the IEEE 802.11 type, for example, to establish an emergency connection in a local network, to telephone a rescue center, even if that user has no right of access to the wireless local network that serves the area in which he is situated at the time he needs rescue.

In companies, it is more and more routine to use a wireless mobile telephone connecting, via an IEEE 802.11 type radio link, to a computer and telephone local network belonging to a company. Certain personal digital assistants and certain personal computers also offer this telephone function.

Access to a company local network is generally restricted to certain users who are employees of that company. When the user of this kind of terminal is on the premises of the company that employs him, he has a right of access to the local network, which enables him to telephone in any circumstances. On the other hand, the same user cannot telephone when he is on the premises of another company, because does not have a right of access in the local network of that other company. In particular, he cannot telephone a rescue centre with his usual terminal, unless the latter is a dual mode terminal, i.e. one also enabling access to a public mobile telephone network such as a GSM network.

A method known in public mobile telephone networks, especially GSM type networks, enables the user of a radio-telephone terminal to establish an emergency connection in that network to telephone a rescue centre, even if that user has no right of access to the network which covers the place in which he is situated and even if there is no SIM (Subscriber Identification Module) card in his terminal. This known method consists in authorizing a user to access a mobile service switching centre via a base station and a base station controller even before the terminal has had to satisfy the procedure for authenticating that user. The mobile service switching centre therefore receives the called number and can tell that it is an emergency number. In this case, it does not initiate the authentication procedure but sets up the requested connection.

This method cannot be transposed to an IEEE 802.11 type network because, in that type of network, all current methods of setting up a connection consist in prohibiting a priori the radio access points from setting up a connection between a terminal and the network before the authentication procedure is satisfied, except for a temporary connection with an authentication server, to be able to carry out the authentication procedure.

FIELD OF THE INVENTION

The object of the invention is to propose a method enabling the user of a wireless telephone terminal to establish on emergency connection in a wireless local network, to telephone a rescue centre, even if that user has no right of access to that local network and the method for establishing a connection in that network prohibits a priori the radio access points from establishing a connection between a terminal and the network before the authentication procedure is satisfied.

BRIEF SUMMARY OF THE INVENTION

The invention consists in method enabling the user of a wireless telephone terminal to establish an emergency connection in a local network, including an authentication server even when this user does not have the right to access this local network, characterized in that it consists, when the user has entered an emergency telephone number, in:
  recognizing this number as an emergency number and then sending a start-up message from the terminal to a radio access point of the network;
  sending a message, which requests its identify of the terminal, from an access point to the terminal in response to the start-up message;
  then sending a message which contains the identify of the terminal and an indication signifying that it is on emergency call, from the terminal to the radio access point of the network;
  transmitting a message containing said identify information and on indication signifying that it is an emergency call from the access point to the authentication server;
  recognizing, in the authentication server, that this message contains an indication signifying that it is on emergency call, and then sending an acceptance message to the terminal via the access point, and;
  recognizing this acceptance message when in transit via the access point and then validating a part of the access point enabling the terminal to establish on emergency connection over the local network.

The invention also consists in a wireless telephone terminal enabling its user to establish an emergency connection in a wireless local network, characterized in that it includes means for:
  recognizing a number as an emergency number when the user has entered an emergency telephone number and then sending a start-up message from the terminal to a radio access point of the network;
  receiving from the access point of the network a response message requesting its identity of the terminal;
  then sending from the terminal to the access point a message containing the identity of the terminal and an indication signifying that this is on emergency call, this message being intended for an authentication server;
  receiving an acceptance message sent by the authentication server via this access point and intended to validate conventionally a port of an access point in order to enable the terminal to establish an emergency connection across the local network; and
  then sending to this access point a message requesting establishing of an emergency connection over the local network.

The invention further consists in an authentication server enabling the user of a wireless telephone terminal to set up an emergency connection in a local network, characterized in that it includes means for:
  receiving via a radio access point a message coming from a terminal and containing the identification of that terminal and an indication signifying that it is an emergency call;
  recognizing in this message the indication signifying that this is an emergency call and then sending to the terminal via this access point an acceptance message intended to validate conventionally a port of this access point in order to enable the terminal to establish an emergency connection across the local network.

BRIEF DESCRIPTION OF THE SEVERAL VIEWS OF THE DRAWING(S)

The invention will be better understood and other features will become apparent in the light of the following description and the accompany figures:

FIG. 2 represents a timing diagram illustrating the known method according to the IEEE 802.11 and IEEE 802.1x standards for authenticating a terminal and then establishing a connection;

FIG. 3 represents a timing diagram illustrating the method according to the invention for authenticating a terminal and then establishing on emergency connection without authenticating the terminal.

DETAILED DESCRIPTION OF THE INVENTION

Figure 1:
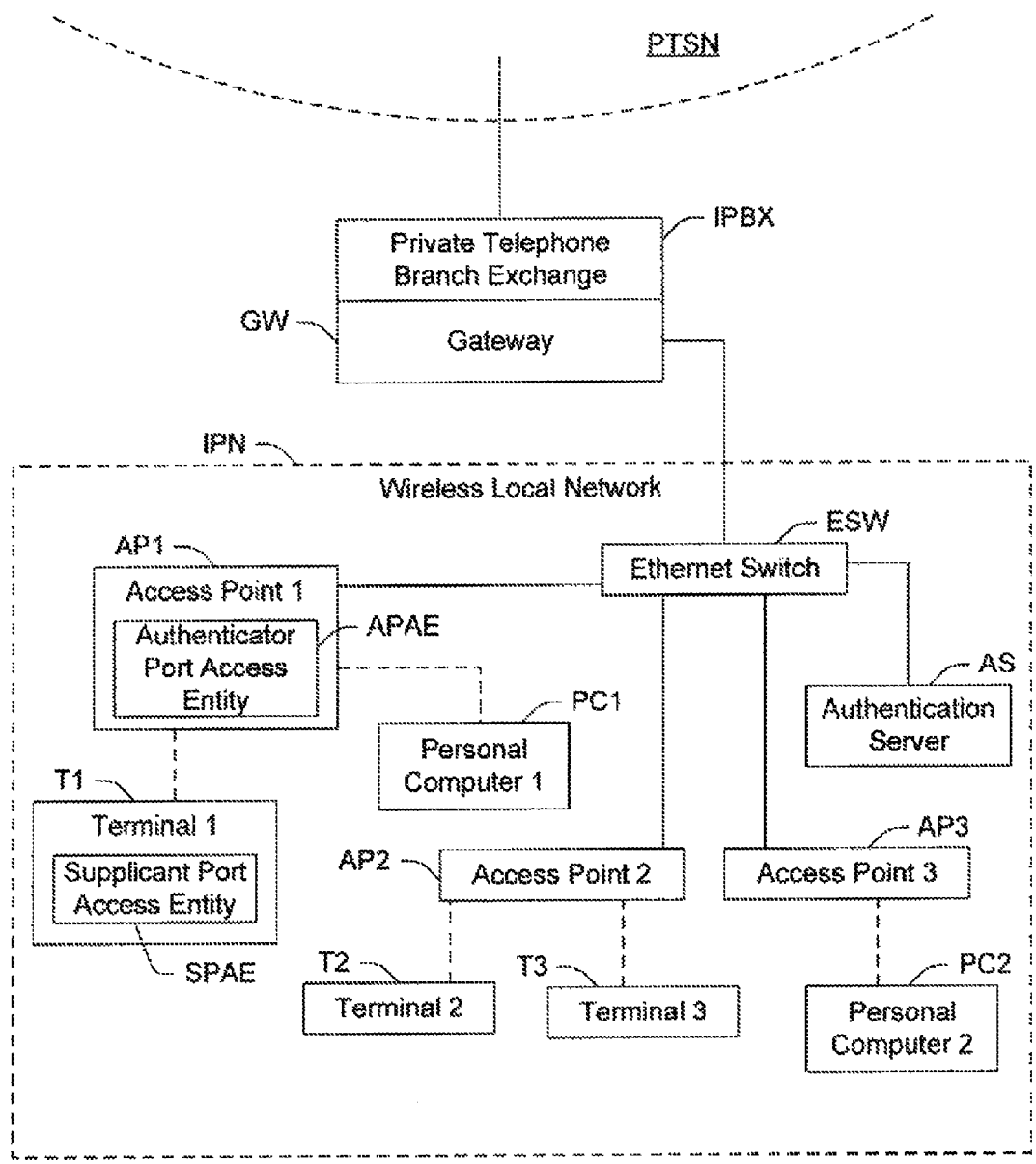
FIG. 1 represents the diagram of one example of an IEEE 802.11 type local network in which the method according to the invention con be implemented.

The IEEE 802.11 type local network IPN represented in FIG. 1 includes:
  an Ethernet switch ESW;
  an authentication server AS, of the RADIUS (Remote Authentication Dial In Service) type for example, connected to a port of the Ethernet switch ESW; and
  radio access points AP1, AP2, AP3 connected to respective ports of the Ethernet switch ESW.

The Ethernet switch ESW is connected to a private telephone branch exchange IPBX via a gateway GW. It enables the establishing of telephone calls in the local network IPN. This telephone branch exchange IPBX is also connected to a public telephone network PSTN.

Wireless telephone terminals T1, T2, T3, . . . and portable computers PC1, PC2, . . . are each connected to one of the radio access points AP1, AP2, AP3, for example by IEEE 802.11 radio links.

Authentication is effected using the Extensible Authentication Protocol (EAP) described in the document IEEE Std 802.1x-2001, for example, for communication between a protocol entity (Supplicant PAE) requesting authentication and an authentication server via a protocol entity (Authenticator PAE) that performs the authentication. The EAP con support diverse authentication methods. There will be considered here by way of example authentication by means of a single-use password, but the method according to the invention may be applied regardless of the authentication method used in the context of the IEEE 802.11 standard. The authentication of the telephone terminal T1 will be considered by way of example.

Each telephone terminal T1, T2, T3, . . . , and each personal computer PC1, PC2, . . . of the network includes software means enabling a port of an access point AP1, AP2, AP3, . . . to execute the procedures for authentication of the terminal. Those software means execute a protocol entity called the Supplicant Port Access Entity (SPAE) in the terminology of the IEEE 802.1x standard. Each access point AP1, AP2, AP3, . . . includes software means for executing a protocol entity associated with a port, that entity being intended to retransmit on authentication request to the authentication server AS. This entity is called the Authenticator Part Access Entity (APAE) in the terminology of the IEEE 802.1x standard. The IEEE 802.1x standard defines a format for encapsulating EAP messages to transmit them over a local network.

This encapsulation, known as EAPOL, is used for all calls between the terminal T1 and the access point AP1, for example. The latter reformats a message coming from the terminal T1 before retransmitting it to the authentication server AS, in accordance with the RADIUS protocol. The access point AP1 validates or inhibits the port susceptible to connect the terminal T1 to the local network, but does not interfere with the exchanges of messages between the terminal T1 and the authentication server AS, which enables the use of on authentication server AS remote from the access point AP1. The access point AP1 is initialized so that this port is inhibited. According to the IEEE 802.1x standard, the access point AP1 validates this port when, while monitoring the exchanges of messages between the terminal T1 and the authentication server AS, it registers the fact that the terminal T1 has been authenticated by the server AS.

FIG. 2 represents a timing diagram illustrating the known method according to the IEEE 802.11 and IEEE 802.1x standards for authenticating a terminal and then establishing a connection. It is used in the network represented in FIG. 1 using terminals T1, T2, T3, . . . , access points AP1, AP2, AP3, . . . and an authentication server AS which are all conventional. FIG. 2 represents the exchanges of messages in accordance with the IEEE 802.1x standard in the situation where the terminal T1 is authenticated successfully. The authentication method described is merely one example, the IEEE 802.1x standard supporting many other authentication methods. This exchange of messages takes place when the terminal is switched on or when the terminal enters the radio coverage area of another access point. The authentication is usually effected well before the request to establish a call.

Step 1: When it is switched on, the terminal T1 sends the access point AP1 a start-up message called the EAPOL-Start message in the terminology of the IEEE 802.1x standard.

Step 2: The access point AP1 responds to it with a message requesting the identity of the terminal this message being called the EAP-Request/Identify message.

Step 3: The terminal T1 sends the access point AP1 a response message containing the identity of the terminal this message being called the EAP-Response/Identify message.

Step 4: The access point AP1 reformats this response message and then forwards it to the authentication server AS. On the other hand, for the time being, it does not allow any other data stream coming from the terminal T1 to pass.

Step 5: The authentication server AS sends the access points AP1 a request message containing a single-use password, called the EAP-Request/OTP, OTP Challenge message.

Step 6: The access point AP1 reformats this request message and then forwards it to the terminal T1.

Step 7: The terminal T1 sends the access point AP1 a response message called the EAP-Response/OTP, OTPpw message.

Step 8: The access point AP1 reformats this response message and then forwards it to the authentication server AS.

Step 9: The authentication server AS verifies the response message sent by the terminal T1. If the verification is positive, it sends the access point AP1 an acceptance message called the EAP-Success message. This message may contain restrictions such as restricted access to a virtual network that is a subset of the network concerned or a set of firewall rules.

Step 10: The access point takes note of this acceptance message, reformats it and then forwards it to the terminal T1, and validates the port that will enable the terminal T1 to communicate with the whole of the local network, and in particular the telephone branch exchange IPBX. The terminal then awaits an event, for example the user requesting the establishing of a telephone call.

FIG. 3 represents a timing diagram illustrating the method according to the invention for establishing on emergency connection without authenticating a terminal. It is implemented in the network represented in FIG. 1 using terminals T1, T2, T3, . . . , and an authentication server AS the respective software means whereof have been adapted to implement the method according to the invention. The access points AP1, AP2, AP3, . . . are standard and necessitate no modification. In this example, the user of the terminal T1 has no right of access in the network IPN but switches on his terminal T1 to establish an emergency connection when he is in the radio coverage area of the network IPN.

Step 11: When it is switched on, the terminal T1 sends the access point AP1 a start-up message called the EAPOL-Start message.

Step 12: The access point AP1 responds to it with a message requesting its identity of the terminal called the EAP-Request/Identity message.

Step 13: The terminal T1 sends the access point AP1 a response message containing the identify of the terminal called the EAP-Response/Identity message.

Step 14: The access point AP1 reformats this response message and then forwards it to the authentication server AS. On the other hand, for the time being, it does not allow any other data stream coming from the terminal T1 to pass.

Step 15: The authentication server AS sends the access point AP1 a request message containing a single-use password called the EAP-Request/OTP, OTP Challenge message.

Step 16: The access point AP1 reformats this request message and then forwards it to the terminal T1.

Step 17: The terminal T1 sends the access point AP1 a response message called the EAP-Response/OTP, OTPpw message.

Step 18: The access point AP1 reformats this response message and then forwards it to the authentication server AS.

Step 19: The authentication server AS verifies the response message sent by the terminal T1. The verification is negative, and it therefore sends the access point AP1 a refusal message.

Step 20: The access point takes notes of this refusal message, and therefore does not validate the port that would enable the terminal T1 to communicate with the whole of the local network, and in particular the telephone branch exchange IPBX. The terminal then awaits an event, for example the user requesting the establishing of an emergency telephone call.

Step 21: The user enters an emergency telephone number (such as 112 in Europe or 911 in USA). The terminal T1 then sends the access point AP1 the standard start-up message called the EAPOL-Start message. This message is triggered by the fact that the user has entered, using the keypad of the terminal T1 or by pressing a dedicated key, the emergency telephone number and that number has been recognized as an emergency number by the terminal T1.

Step 22: The access point AP1 responds to it with the standard request message containing identity information called the EAP-Request/Identify message.

Step 23: The terminal T1 sends the access point AP1 a response message of a new type containing said identify information and an indication signifying that it is an emergency call. On the other hand, the emergency telephone number (such as 112 in Europe or 911 in USA) may not be transmitted.

Step 24: The access point AP1 reformats this response message and then forwards it to the authentication server AS.

Step 25: The authentication server AS recognizes in the message the indication signifying that it is an emergency call. The authentication server AS then sends the access point AP1 an acceptance message of a new type containing on indication signifying that this is a temporary authentication, valid only for the duration of an emergency call, i.e. up to a clearing down operation initialized by the rescue centre that has responded to the emergency call. The terminal T1 will then lose all its rights of access to the network.

Step 26: The access point AP1 reformats this acceptance message and then forwards it to the terminal T1, and validates the port that will enable the terminal T1 to communicate with the whole of the local network, until it receives a clearing down message sent by the rescue center that has responded to the emergency call.

Step 27: The terminal T1 sends the access point AP1 a message requesting establishing of a telephone connection, but this message is of a particular type that requests a connection to a rescue center without mentioning the emergency telephone number entered by the user (such as 112 in Europe or 911 in USA). This message will be routed by the local network to the branch exchange IPBX and it is the branch exchange IPBX that will enter an emergency telephone number. Thus it is not possible to use this method to circumvent authentication for fraudulent purposes.

In a variant embodiment, the authentication server may be integrated into a radio access point instead of being remote.

The scope of the invention is not limited to IEEE 802.11 type networks, and it may be applied in any network in which the method of establishing a connection in the network prohibits a priori the radio access points from establishing a connection between a terminal and the network before the authentication procedure is satisfied.

The invention claimed is:

1. A wireless terminal for establishing an emergency connection for a user in a wireless local network, wherein the user is a non-subscriber to the local network, comprising a processor configured to:
   recognize a number as an emergency number when the user has entered an emergency telephone number, and send a start-up message from the terminal to a radio access point of the network;
   receive from the access point of the network a response message requesting the identity of the terminal;
   send from the terminal to the access point a message containing the identity of the terminal and an indication signifying that the start-up message is for an emergency call;
   receive an acceptance message via the access point, wherein the acceptance message triggers validation of a port of the access point in order to enable the terminal to establish an emergency connection across the local network; and
   send to the access point a message requesting establishment of an emergency connection over the local network.

2. The wireless terminal according to claim 1, wherein the local network is an IEEE 802.11 type local network.

3. The wireless telephone terminal according to claim 1, wherein the authentication server is a remote authentication dial-in service type authentication server.

4. The wireless terminal according to claim 1, wherein the emergency telephone number entered by the user is not transmitted with the message containing the identity information and the indication signifying that it is an emergency call from the access point to the authentication server.

5. An authentication server for setting up an emergency connection for a user of a wireless telephone terminal in a local network, wherein the user is a non-subscriber to local network, comprising a processor configured to, when the user has entered an emergency telephone number:
receive a message containing identity of a terminal and an indication signifying that it is an emergency call from the access point at the authentication server;
recognize, in the authentication server, that the message comprises an indication signifying that it is an emergency call; and
send an acceptance message to the terminal;
wherein an emergency telephone number entered by the user is not transmitted with the message containing the identity information and the indication signifying that it is an emergency call from the access point to the authentication server.

6. The authentication server according to claim 5, wherein the local network is an IEEE 802.11 type local network.

7. The authentication server according to claim 5, wherein the authentication server is a remote authentication dial-in service type authentication server.

8. The authentication server according to claim 5, wherein the acceptance message includes an indication signifying that a temporary authentication is being provided to the terminal, which is valid only for the duration of the emergency call.

9. The authentication server according to claim 8, wherein the temporary authentication is terminated upon a "clearing down" operation initialized by a rescue center that has responded to the call.

10. A method for establishing an emergency connection for a calling wireless terminal in a local network when the calling wireless terminal is not subscribed to the local network, the method comprising, when an emergency telephone number is indicated at the calling wireless terminal as a called destination:
recognizing the number as an emergency number at the calling wireless terminal, and, in response to such recognition, sending a start-up message from the calling wireless terminal toward a radio access point of the network;
receiving at the calling wireless terminal a message requesting the identity of the calling wireless terminal, said message requesting the identity of the calling wireless terminal having been originated at the radio access point and having been sent toward the calling wireless terminal in response to the start-up message;
sending from the calling wireless terminal toward the radio access point of the network, in response to receipt of the message requesting the identity of the calling wireless terminal, a message which includes the identity of the terminal and an indication signifying that the message including the identity of the calling wireless terminal is for an emergency call;
receiving at the calling wireless terminal an acceptance message originated at an authentication server; and
establishing an emergency connection from the calling wireless terminal and to the local network.

11. The method according to claim 10, wherein the emergency telephone number entered by the user is not transmitted with the message containing the identity information and the indication signifying that it is an emergency call from the access point to the authentication server.

12. A method for establishing an emergency connection for a calling wireless terminal in a local network including an authentication server, wherein the calling wireless terminal is not subscribed to the local network, the method comprising, when an emergency telephone number is specified as a called destination:
receiving, at the authentication server, a message which includes the identity of the calling wireless terminal and an indication signifying that the message including the identity of the calling wireless terminal relates to an emergency call, the message including the identity of the calling wireless terminal;
transmitting from the authentication server an acceptance message, the acceptance message indicating that the authentication server has determined that the message including the identity of the calling wireless terminal relates to an emergency call;
wherein the acceptance message includes an indication signifying that a temporary authentication is being provided to the terminal, which is valid only for the duration of the emergency call.

13. The method according to claim 12, wherein the authentication server is a remote authentication dial-in service type authentication server.

14. The method according to claim 12, wherein the temporary authentication is terminated upon a "clearing down" operation initialized by a rescue center that has responded to the call.

15. The method according to claim 12, wherein the acceptance message is transmitted to a radio access point.

16. The method according to claim 12, wherein the acceptance message is transmitted to the wireless terminal via a radio access point.

17. The method according to claim 12, wherein the acceptance message further indicates that access is granted to the calling wireless terminal only for a call to the destination specified by the emergency telephone number.

18. An apparatus for establishing an emergency connection for a calling wireless terminal in a local network when the calling wireless terminal is not subscribed to the local network and when an emergency telephone number is indicated at the calling wireless terminal as a called destination, the apparatus comprising:
a processor configured to recognize the number as an emergency number at the calling wireless terminal, and, in response to such recognition, sending a start-up message from the calling wireless terminal toward a radio access point of the network;
a receiver configured to receive at the calling wireless terminal a message requesting the identity of the calling wireless terminal, said message requesting the identity of the calling wireless terminal having been originated at the radio access point and having been sent toward the calling wireless terminal in response to the start-up message;
a transmitter configured to transmit from the calling wireless terminal toward the radio access point of the network, in response to receipt of the message requesting the identity of the calling wireless terminal, a message which includes the identity of the terminal and an indication signifying that the message including the identity of the calling wireless terminal is for an emergency call;

wherein the receiver is further configured to receive at the calling wireless terminal an acceptance message originated at an authentication server; and wherein the processor is further configured to establish an emergency connection from the calling wireless terminal to the local network.

19. An authentication server for establishing an emergency connection for a calling wireless terminal in a local network when an emergency telephone number is specified as a called destination, wherein the calling wireless terminal is not subscribed to the local network, the authentication server comprising:

a receiver configured to receive a message which includes the identity of the calling wireless terminal and an indication signifying that the message including the identity of the calling wireless terminal relates to an emergency call, the message including the identity of the calling wireless terminal;

a transmitter configured to transmit an acceptance message, the acceptance message indicating that the authentication server has determined that the message including the identity of the calling wireless terminal relates to an emergency call;

wherein the acceptance message includes an indication signifying that a temporary authentication is being provided to the terminal, which is valid only for the duration of the emergency call.

20. The authentication server according to claim 19, wherein the acceptance message is transmitted to a radio access point.

21. The authentication server according to claim 19, wherein the acceptance message is transmitted to the wireless terminal via a radio access point.

22. The authentication server according to claim 19, wherein the acceptance message further indicates that access is granted to the calling wireless terminal only for a call to the destination specified by the emergency telephone number.

* * * * *